United States Patent [19]
Schindl

[11] 3,798,435
[45] Mar. 19, 1974

[54] VERSATILE LIGHT SOURCE FOR A MICROSCOPE

[75] Inventor: Klaus P. Schindl, Vienna, Austria

[73] Assignee: C. Reichert Optische Werke AG, Vienna, Austria

[22] Filed: Aug. 9, 1973

[21] Appl. No.: 387,081

[52] U.S. Cl. ................. 240/2 MA, 350/87, 350/91
[51] Int. Cl. .......................................... F21r 33/00
[58] Field of Search ............ 240/2 MA; 350/87, 91

[56] References Cited
UNITED STATES PATENTS
3,518,014  6/1970  Weber............................. 350/87 UX
3,551,019  12/1970  Michel............................. 350/87 X FOREIGN PATENTS OR APPLICATIONS
950,631  2/1964  Great Britain.................. 240/2 MA Primary Examiner—Richard M. Sheer
Attorney, Agent, or Firm—A. H. Spencer; W. C. Nealon; H. R. Berkenstock, Jr.

[57] ABSTRACT

An assembly capable of providing light for incident or transmitted microscopy for ultraviolet light and white light microscopy techniques utilizes four lamps and an arrangement of mirrors capable of changing the light exit path from the assembly and selecting the desired type of light source.

3 Claims, 2 Drawing Figures

3,798,435

VERSATILE LIGHT SOURCE FOR A MICROSCOPE

BACKGROUND OF THE INVENTION

It has been frequently desirable to provide apparatus for diversified advanced microscopy techniques, including transmitted and incident light microscopy as well as bright field, dark field, phase contrast, interference contrast and fluorescent microscopy. Conventional illumination apparatus usually involves a plurality of interchangeable units which are attached to a microscope for different types of illumination or in different positions on the microscope depending on the microscopy technique to be applied. Not only is the use of such equipment inconvenient and susceptible to improper alignment and loss of available light and poor efficiency due to complicated optical or mechanical arrangements; but these disadvantages are compounded by high cost resulting from the need to provide secure, vibration-free mountings having proper alignment and complex optical systems essential to conduct light from the source into the microscope optical system.

BRIEF DESCRIPTION OF THE PRESENT INVENTION

The present inveniton relates to light sources for microscopes, and more particularly it relates to a four lamp light source for providing light through a mirror system for use with either transmitted or incident light microscopy, for use with both broad bond emission spectrum and ultraviolet light microscopy techniques. More particularly, the present invention relates to a pair of broad spectrum light sources such as quartz iodine lamps, one for transmitted and one for incident light use, and a pair of very high intensity light sources, such as xenon arc, mercury vapor, cesium iodine arc, or the like. By proper arrangement of mirrors, it is possible to selectively direct light of the desired type into a microscope for either transmitted or incident light microscopy. It is even possible to provide a combination of ultraviolet and broad spectrum illumination for advanced transmitted light techniques.

FIG. 1 is an optical diagram of a four lamp multiple mirror system according to the present invention; and FIG. 2 is a front view of a microscope and a preferred control arrangement for the illumination system of FIG. 1.

DETAILED DESCRIPTION OF THE PRESENT INVENTION

A. Transmitted Light Microscopy

Figure 2:
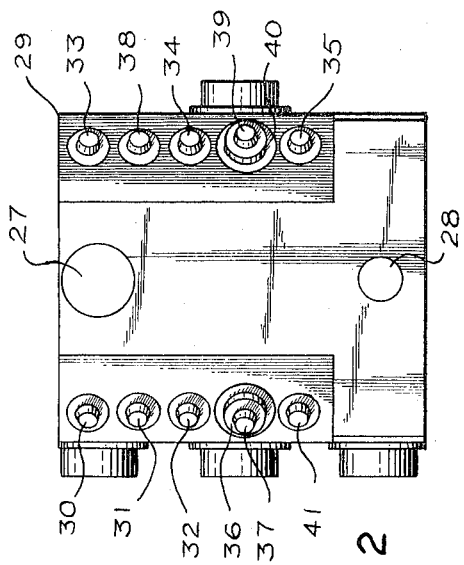
Figure 1:
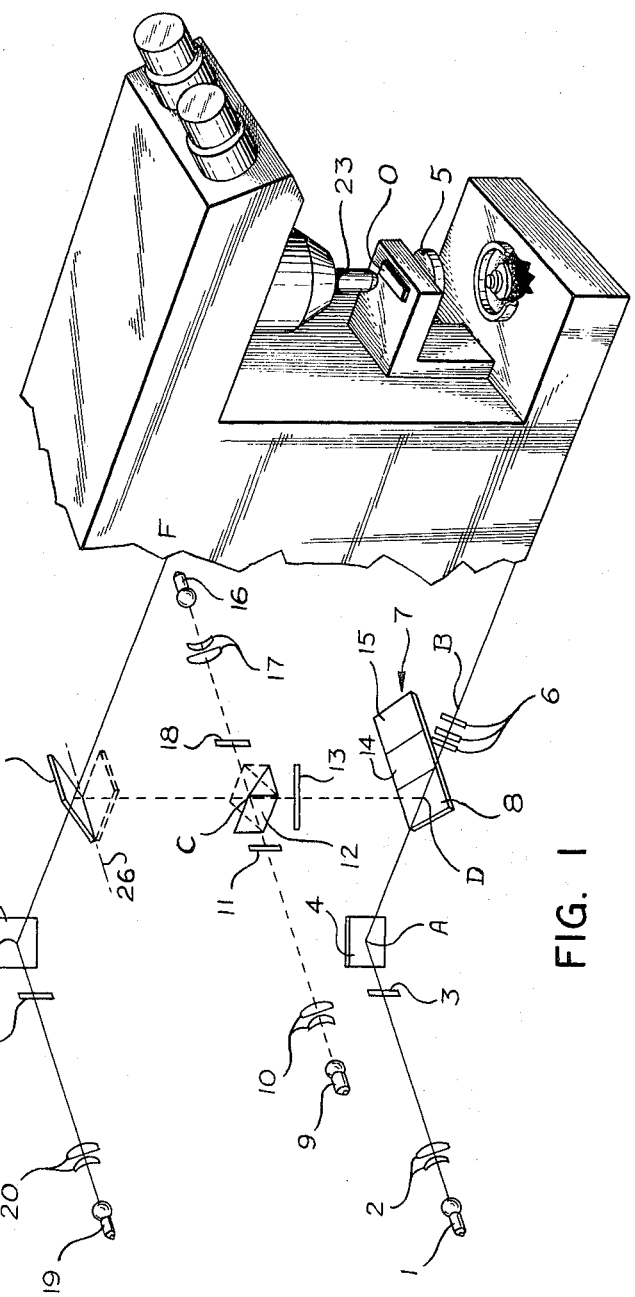

Referring to the drawing, illumination from quartz iodine lamp 1 is transmitted through collector 2 and heat filter 3 and by a 90° deflection from mirror 4 into the base of a microscope having an optical system (not shown) for transmitting the light to the object through a condenser 5. Various filters and diffuser plates may be selectively placed at 6 to provide light of desired characteristics for transmission into the microscope system.

A sliding unit 7 is located intermediate mirror 4 and light modifiers 6. The sliding unit is adapted to have a plurality of positions, with three being shown. The first position, which is that illustrated in the drawing, provides an opening for unobstructed or modified transmission of the light from mirror 4 through modification elements 6 by opening 8. Light source 9 is one source of very high intensity illumination such as cesium iodide spectral lamp. Illumination from source 9 is transmitted via collector 10 through heat filter 11 and deflected by rotatable prism 12 and optionally through ultraviolet filter 13 or directly onto full mirror 14 or dichroic mirror 15 of sliding unit 7 which may be selectively positioned along the light path C-B. From position D along the light path, the light is transmitted through modifying station 6 to the microscope and thence through the condenser to the object O. The position of sliding unit 7 to align full mirror 14 in the light path is used to provide only light from source 9 to the object. It is also possible to position sliding unit 7 with dichroic mirror 15 in the light path which permits light from sources 1 and 9 to be combined at position D along the light path when desired for transmitted light microscopy.

Light source 16 is also for fluorescent microscopy or when extremely high illumination intensity is required and is of greater brilliance than light source 9. The light is transmitted via collector 17 through heat filter 18 to prism 12. For transmitted light microscopy, prism 12 is rotated 180° from the position used with light source 9 to the position indicated by the dotted outline of rotatable prism 12. The light reflected from prism 12 travels through ultraviolet filter 13 (optionally) and is deflected by either full mirror 14 or dichroic mirror 15 through modifying element 6 into the microscope. Light from source 16 may also be combined with the broad spectrum illumination obtained from source 1 as desired by using the dichroic mirror 15. Light for source 16 is useful for photographic work, especially movies and large screen projection, as well as for blue and green fluorescent studies.

B. Incident Light Microscopy

White light, or broad spectrum illumination of moderate intensity for incident light microscopy is obtained from source 19 which is transmitted via collector 20 through heat filter 21 and deflected from mirror 22 along the path E-F from which the light is conducted within the microscope for incident illumination through objective 23 on the object O. Mirror 24 is capable of pivoting along axis 26 and is swung into the position indicated by the dotted line when using light from source 19.

Light from either of the high intensity sources 9 or 16 may be used for incident microscopy by positioning rotatable prism 12 in the opposite position for that of the respective light source when used for transmitted light microscopy. That is, rotatable prism 12 is rotated as outlined by solid lines for utilizing light from source 16 for incident light microscopy and positioned as outlined in dotted lines when using light from source 9 for incident light microscopy.

Referring to FIG. 2, a microscope (not shown) is generally located in front of the illumination system which transmits the light into the microscope via openings 27 and 28 in illumination housing 29. Control knob 33 operates swinging mirror 24 and control knob 38 pivots rotatable prism 12 for the selected light source and form of microscopy. Knob 34 focuses the collector for illumination source 16 and knobs 30, 32 and 41 are the controls for adjusting the respective collectors for light sources 19, 9 and 1. Control knobs 39 and 40 are used to selectively insert contrast and ultraviolet filters.

Control knobs 36, 31 and 37 are used to selectively change the filters, ground glass, and other elements of light modifier 6. Control 35 is used to selectively position sliding mirror 7.

The foregoing description of embodiments of the applicant's invention is given by way of illustration and not of limitation. The concept and scope of the invention is limited only by the following claims and equivalents thereof which may occur to others skilled in the art.

What is claimed is:

1. A microscope illuminator comprising a first moderate intensity light source, a first collector lens system to direct light from said source along a first path, a mirror disposed in said path to reflect said light along a second path, a first exit from the illuminator at the distal end of said second light path to a microscope for transmitted light microscopy, a first high intensity light source, a second collector lens system to direct light from said high intensity source along a third path, a manually rotatable reflector to selectively direct light from said third path along one of at least two selected paths, one of said selected paths being a fourth light path intersecting said second light path, ultraviolet filter means selectively positionable in said fourth path, a manually slidable, three position unit located at the intersection of said second and fourth light paths, said unit having a first position to pass light from said mirror to the first exit along said second light path, said unit having a second position to reflect light from the fourth light path along the second light path to said first exit, said unit having a third position to pass at least a portion of the moderate intensity light along the second light path and reflect toward said exit at least a portion of the light from the fourth light path to combine with the moderate intensity light, a second high intensity light source, a third collector lens system to direct light from said second high intensity light source along a sixth path to said manually rotatable reflector, said manually rotatable reflector selectively directing light from said sixth light path along one of said selected paths, a second moderate intensity light source, a collector lens system for directing light therefrom along a seventh light path, a fixed mirror to deflect the light from the seventh light path along an eighth light path, a second exit at the distal end of said eighth light path to a microscope for reflected light microscopy, the other of said selected paths being a fifth light path intersecting said eighth light path between said fixed mirror and said second exit, a manually pivotable mirror positionable at the intersection of said fifth and eighth light paths, said manually pivotable mirror having one position outside said eighth light path and a second position at the intersection of said fifth and said eighth light paths to reflect light from said fifth light path along the eighth light path toward said second exit.

2. The illuminator of claim 1 wherein said first and second moderate intensity light sources are quartz-iodine lamps, said first high intensity light source is a xenon arc, and said second high intensity light source is a cesium iodide arc.

3. The illuminator of claim 2 further including at least one filter selectively positionable in the second light path between the sliding unit and the first exit.

* * * * *